United States Patent [19]
Goings

[11] Patent Number: 5,659,958
[45] Date of Patent: Aug. 26, 1997

[54] CATCHER FOR SICKLEBAR MOWER HEDGE TRIMMER

[76] Inventor: Walter W. Goings, 309 Prospect Dr., SW., Leesburg, Va. 22075

[21] Appl. No.: 490,570

[22] Filed: Jun. 15, 1995

[51] Int. Cl.⁶ .................... B26B 19/38; B26B 19/48
[52] U.S. Cl. .................. 30/124; 30/132; 30/216
[58] Field of Search ............... 30/132, 124, 216, 30/208, 210

[56] References Cited

U.S. PATENT DOCUMENTS

| | | | |
|---|---|---|---|
| D. 335,247 | 5/1993 | Gittery | D8/8 |
| 1,389,554 | 8/1921 | Johnson | 56/194 |
| 2,281,189 | 4/1942 | Wright | 30/132 |
| 2,510,311 | 6/1950 | Greene | 30/132 |
| 2,747,276 | 5/1956 | Yatsko | 30/132 |
| 3,073,025 | 1/1963 | Yatsko | 30/132 |
| 3,212,188 | 10/1965 | Riley, Jr. et al. | 30/216 |
| 3,552,013 | 1/1971 | Stone | 30/132 |
| 3,699,655 | 10/1972 | Taylor et al. | 30/216 |
| 3,795,050 | 3/1974 | Latsha | 30/132 |
| 3,916,521 | 11/1975 | Sekelsky | 30/132 |
| 4,071,951 | 2/1978 | Burns | 30/132 |
| 4,106,191 | 8/1978 | Haralambou | 30/132 |
| 4,127,938 | 12/1978 | Slingerland, Jr. | 30/132 |

*Primary Examiner*—Douglas D. Watts
*Assistant Examiner*—Elizabeth Stanley
*Attorney, Agent, or Firm*—Alfred J. Mangels

[57] ABSTRACT

A clipping catcher for connection to a powered hedge trimmer to catch trimmings severed from a plant, such as a hedge or bush, by the hedge trimmer. The catcher includes a plurality of catcher panels that are hingedly connected along respective opposed longitudinal edges of the adjacent panels. The catcher panels are held in a predetermined angular relationship relative to each other by end clips that engage end edges of respective adjacent catcher panels to define a catcher that, when viewed in cross-section, has a C shape. The end clips are pivotable about hinge pins and are movable axially relative to the catcher panels to permit withdrawal of the end clips from the end edges of the catcher panels for reorientation of the catcher panel members relative to each other to enable the catcher to be utilized in each of two opposite directions of movement of the hedge trimmer, and without requiring removal of the catcher from the hedge trimmer cutter assembly.

14 Claims, 4 Drawing Sheets

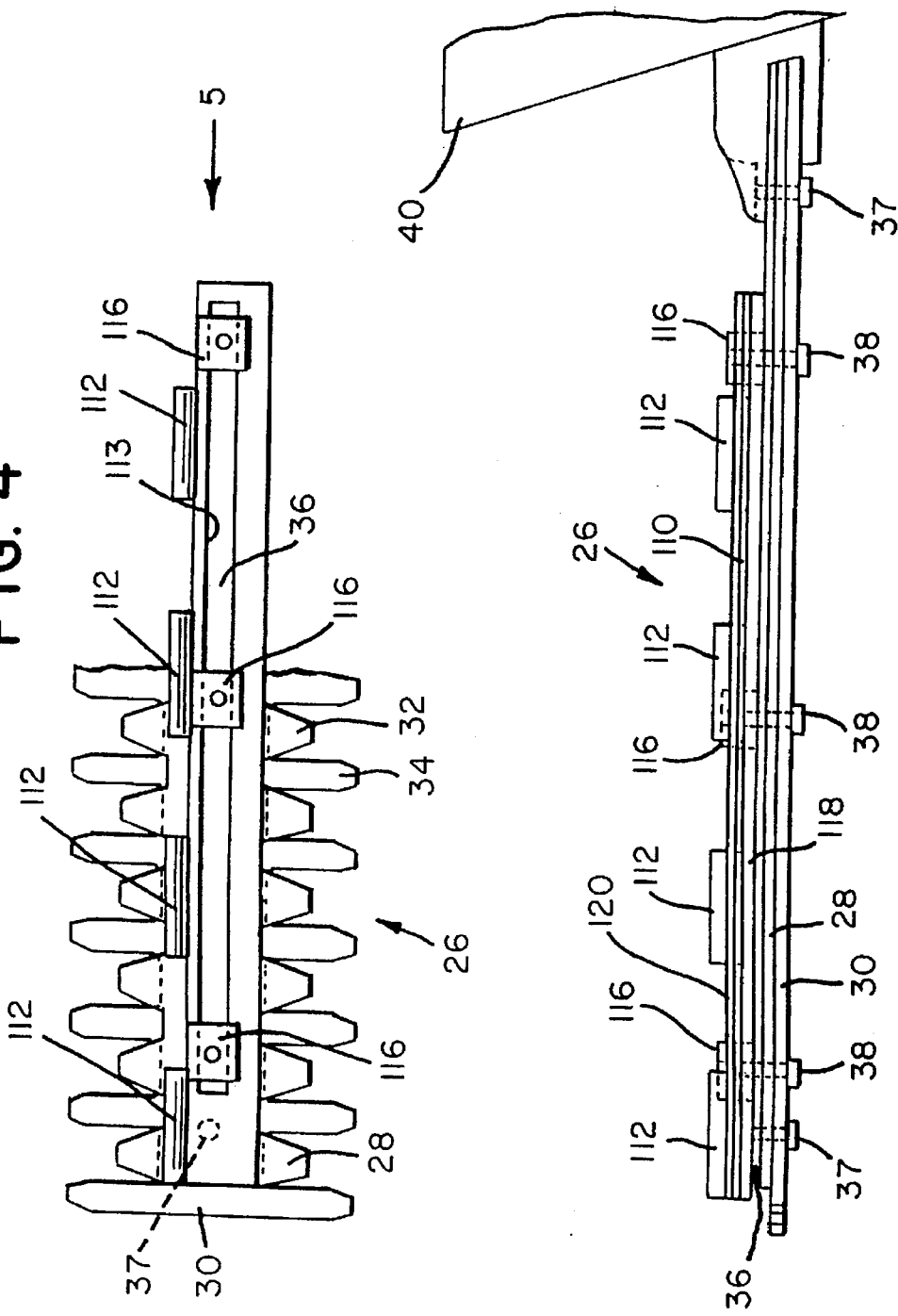

CATCHER FOR SICKLEBAR MOWER HEDGE TRIMMER

BACKGROUND OF THE INVENTION

1. Field of the Invention

The present invention relates to a clipping catcher for use with an electrically-powered hedge trimmer having a pair of relatively movable, elongated blade members each having a plurality of tooth-type, double-edged cutting blades. More particularly, the present invention relates to a hedge clipping catcher that is attached to a stationary blade member and is readily reversible in position, relative to the blade member, without the need for disconnection of the catcher from the blade member, to permit clippings to be caught regardless of the direction in which the hedge trimmer is caused to move in the course of a cutting operation.

2. Description of the Related Art

Electrically-powered hedge clippers are well known, and have made substantially easier the chore of trimming hedges, shrubs, and the like. Typically, such clippers have a pair of elongated blade members, each of the blade members having a plurality of spaced, laterally extending cutter teeth, having cutting edges on each side of the teeth, so that when the blades are longitudinally reciprocated relative to each other, the cutting teeth on one blade move relative to the cutting teeth on the second blade to provide a cutting action along a linear swath of predetermined width, based upon the lengths of the cutter blades. An example of a typical electric hedge clipper structure is illustrated and described in U.S. Pat. No. 3,699,655, which issued on Oct. 24, 1972, to Robert W. Taylor and Jerry W. Sellers.

Although electric hedge clippers significantly reduce the actual cutting time for trimming of hedges and bushes, as compared with the former, scissor-type, hand-operated hedge clipper, the time consuming task of removing and collecting the clippings remains. In that connection, several approaches have been devised in an effort to provide a suitable catching mechanism to eliminate the need for manually collecting and removing the clippings from the hedge or bush that has been trimmed. Specifically, in U.S. Pat. No. 3,916,521, which issued on Nov. 4, 1975, to George Sekelsky, there is disclosed a hedge clipping catcher tray that includes a narrow, rectangular bottom plate that is bolted to the hedge trimmer blade assembly. A second, generally rectangular body portion is hingedly connected with the bottom plate to define a collector on which the clippings gather after they have been severed from the hedge or bush. The body portion is angularly adjustable relative to the bottom plate by a curved slot and bolt arrangement that includes a wing nut for fixing the main body in a desired angular relationship relative to the bottom plate. Although generally suitable for its intended purpose, the Sekelsky structure is illustrated in conjunction with a single-sided cutter blade assembly, for cutting movement in only one direction. Even if used with a double-sided cutter assembly, capable of cutting in two directions of movement, the disclosed structure does not permit rapid changeover from one direction of movement of the hedge trimmer to the other, but, instead, requires the removal of at least two bolts to permit separation of the catcher from the blade assembly so it can be turned through 180° and then reattached to the blade assembly. The requirement to separate and then reattach the catcher tray, depending upon the direction in which the hedge trimmer is intended to be moved, renders the overall trimming operation cumbersome and more time consuming.

Another form of clipping catcher for an electric hedge trimmer is disclosed in U.S. Pat. No. 3,073,025, which issued on Jan. 15, 1963, to J. F. Yatsko. That catcher device also includes a base or mounting plate that is bolted to the blade assembly, and a hingedly connected extension plate that can be oriented at a predetermined angular position relative to the base plate and held in position by a ball and detent arrangement. However, as was the case with the Sekelsky structure, the Yatsko clipping catcher also must be unbolted from the blade assembly, turned through 180°, and reattached to the blade assembly if it is desired to reverse the direction of movement of the hedge trimmer relative to the hedge or bush being trimmed. Further, it should be noted that although both the Sekelsky and Yatsko patents disclose hedge trimmers having only a one-sided blade arrangement, permitting a cutting operation in only one direction, from right to left, it will be apparent that those devices are readily adaptable to a double sided cutting blade assembly of the type illustrated and described in the Taylor et al. '655 patent identified above.

Other issued U.S. patents that show different forms of clipping catcher structures include U.S. Pat. Nos. 1,389,554; 2,510,311; 3,795,050; 4,071,951; 4,106,191; and Des. 335, 247.

It is an object of the present invention to overcome the deficiencies in the previously-disclosed clipping catcher structures.

It is a further object of the present invention to provide a clipping catcher for an electric hedge trimmer wherein the catcher is readily reversible relative to the cutting blades, and without the need to disconnect the catcher from the blade assembly, to thereby permit rapid changeover from left-to-right cutting to right-to-left cutting, and vice-versa.

SUMMARY OF THE INVENTION

Briefly stated, in accordance with one aspect of the present invention, a clipping catcher structure is provided for a powered hedge trimmer. The catcher includes a support strip for attachment to a stationary element of a hedge trimmer cutting blade assembly that includes a pair of relatively movable cutting blades for cutting vegetation. A plurality of hingedly connected, side-by-side panel members are provided to define a generally rectangular, articulated catcher body that is hingedly connected with the support strip. Edge connector members are provided at respective hinge joints between the articulated panel members for engaging edge portions of each of a pair of adjacent panel members to maintain the panel members in a predetermined angular relationship relative to each other, to thereby provide a catcher having a generally C-shaped cross section.

BRIEF DESCRIPTION OF THE DRAWINGS

FIG. 3 is a fragmentary side elevational view of the blade assembly for the hedge trimmer shown in FIGS. 1 and 2.

FIG. 4 is a fragmentary top plan view of the blade assembly of the hedge trimmer shown in FIGS. 1 and 2.

DESCRIPTION OF THE PREFERRED EMBODIMENTS

Figure 1:
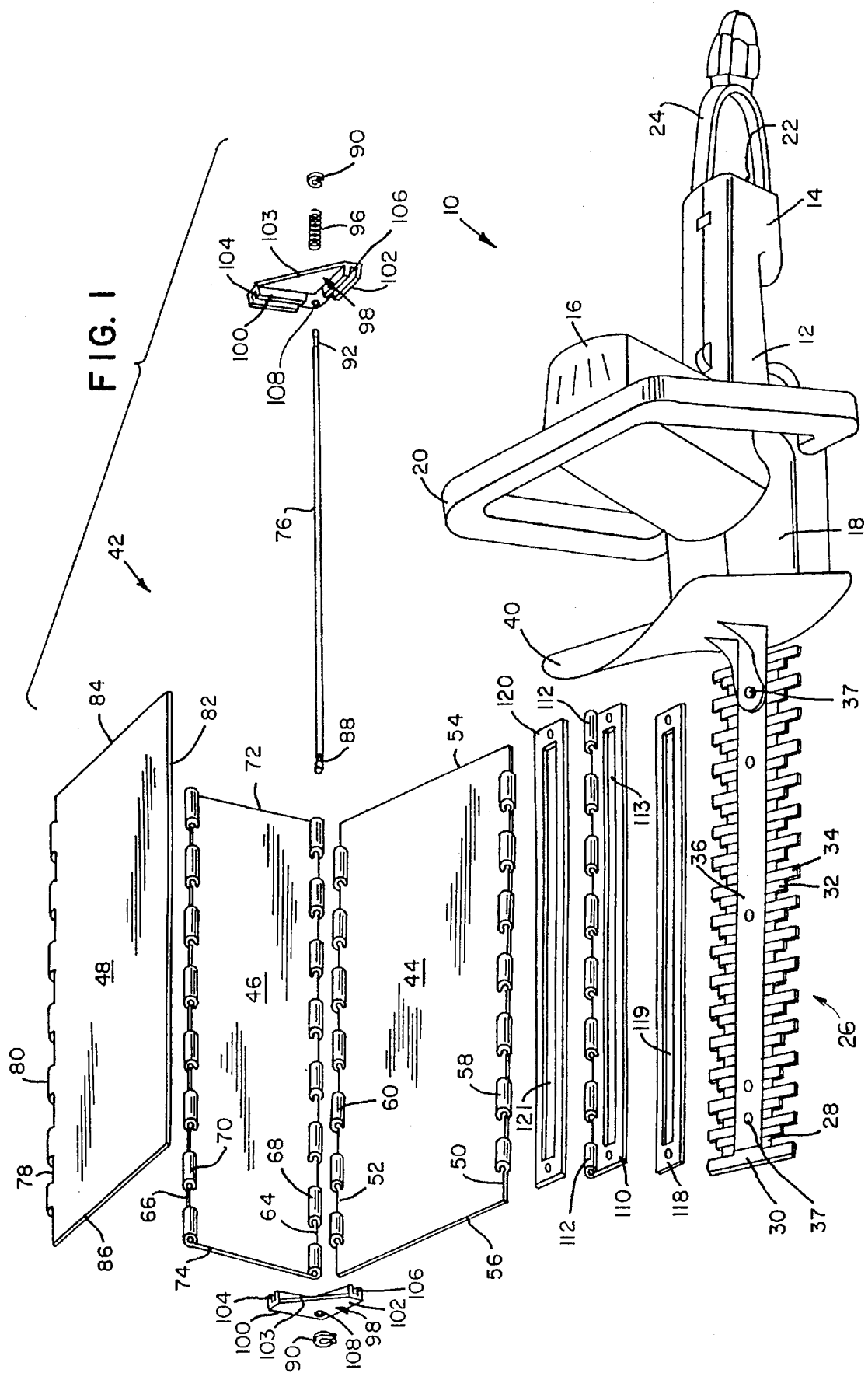
FIG. 1 is a perspective view of an electrically operated hedge trimmer that includes, in exploded form, several of the major elements of a clipping catcher in accordance with the present invention.
Figure 2:
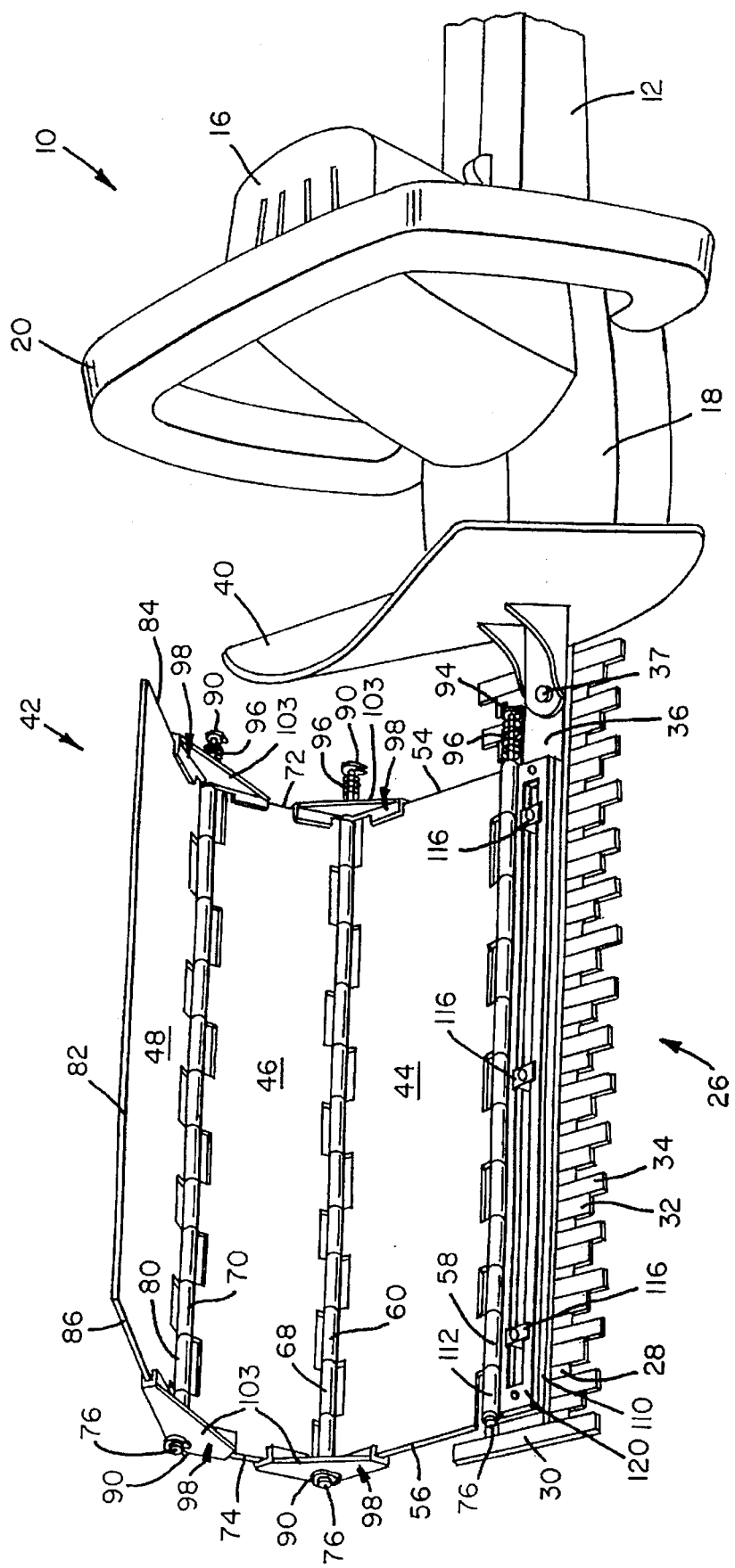
FIG. 2 is a perspective view similar to FIG. 1, showing a portion of the hedge trimmer and also showing the clipping catcher parts shown in FIG. 1 in assembled form and attached to the hedge trimmer blade assembly.

Referring now to the drawings, and particularly to FIGS. 1 and 2 thereof, there is shown a conventional, commercially-available, electrically-powered hedge trimmer 10 that includes a housing 12 having a handle 14, a motor housing 16, and a transmission housing 18. Housing 12 can be made from an injection molded plastic material, such as, for example, polystyrene, polycarbonate, or the like, as will be appreciated by those skilled in the art. Connected with housing 12 and extending upwardly therefrom is a hand grip 20 so that, when in operation, one hand of the user grips handle 14 while the other hand grips hand grip 20.

Motor housing 16 surrounds and encloses an electric motor (not shown) that derives its power either from a power cord connected with an electrical main (not shown) or from a self-contained rechargeable battery (not shown). In that regard, the embodiment illustrated in FIGS. 1 and 2 carries a socket 22 at the proximal end of handle 14, to receive a female plug from an extension cord (not shown), and includes a cord retainer 24 to permit looping of the power cord thereabout to thereby prevent inadvertent withdrawal of the power plug from socket 22 during use of the hedge trimmer. One suitable form for a hedge trimmer powered by electricity from the power mains is illustrated and described in U.S. Pat. No. 3,699,655, which issued on Oct. 24, 1972, to Robert W. Taylor et al. One form of battery-operated, or cordless electric hedge trimmer is illustrated and described in U.S. Pat. No. 3,212,188, which issued on Oct. 19, 1965, to Robert H. Riley, Jr. et al. The disclosures contained in each of the Taylor et al. '655 patent and of the Riley, Jr. et al. '188 patent are hereby incorporated herein by reference, to the same extent as if fully rewritten.

Extending outwardly from housing 12 in a direction opposite from the direction in which handle 14 extends, is an elongated blade assembly 26 that includes a movable blade 28 and a stationary blade 30. Each of blades 28 and 30 is in the form of an elongated, generally rectangular metallic strip, each of which includes a plurality of transversely extending, longitudinally spaced tooth members 32, 34, respectively, that extend laterally outwardly from each side edge of the respective movable and stationary blades 28, 30, respectively. As best seen in FIGS. 1, 2, and 4, the lengths of teeth 34 on stationary blade 30 are longer than those of teeth 32 on movable blade 28, to provide gaps into which the stalks of vegetation can pass to be cut by the teeth as the hedge trimmer is moved into the vegetation when the trimmer is in operation. Consequently, when the blades 28 and 30, respectively, are moved relative to each other in a longitudinal direction, the resulting relative movements of the tooth members of each of the movable and stationary blades define a series of relatively movable cutters of the scissors-type for cutting a swath of vegetation to trim a hedge, a shrub, or a bush.

A narrow, elongated blade retainer strip 36 overlies movable blade 28 and is connected to stationary blade 30 by a pair of spaced bolts 37 (see FIGS. 1 and 3) to provide a blade assembly 26, as shown. Finally, also carried by housing 12 is a plate-like protective guard member 40 that is positioned between blade assembly 26 and hand grip 20, and that also serves as a deflector for preventing clippings from gathering on transmission housing 18.

A clipping catcher assembly 42 in accordance with the present invention is adapted to be connected with blade assembly 26 for catching and retaining clippings as they are separated from a plant by the operation of the hedge trimmer cutter blades. Catcher assembly 42 is shown in exploded form in FIG. 1 and in assembled form in FIG. 2. As shown, catcher assembly 42 includes a plurality of generally rectangular catcher panel members 44, 46, 48 that are hingedly connected together in sequence along their respective longitudinal edges 52, 64 and 66, 78, respectively. Specifically, catcher assembly 42 includes a first rectangular catcher panel member 44 that is generally adapted to lie in a plane that is substantially parallel with the direction of movement of blade assembly 26 when hedge trimmer 10 is in operation. First catcher panel member 44 includes a pair of substantially parallel, longitudinally extending opposed side edges 50, 52, and a pair of opposed, generally parallel, transversely extending end edges 54, 56. Each of side edges 50, 52 includes a plurality of longitudinally spaced hinge loops 58, 60, respectively, the loops of each group being coaxially positioned for slidably receiving an elongated hinge pin 76.

Second catcher panel member 46 is configured similar to first catcher panel member 44 and includes a pair of opposed, generally parallel, longitudinally extending side edges 64, 66, along each of which is positioned a respective group of longitudinally extending, spaced, hinge loops 68, 70, respectively. Second catcher panel member 46 also includes a pair of opposed, substantially parallel end edges 72, 74. As will be apparent from FIGS. 1 and 2, individual loops of the respective groups of hinge loops 60 and 68, that are on adjacent side edges 52 and 64 of the respective first and second catcher panel members 44, 46, are longitudinally offset from one another to permit interengagement of the hinge loops to provide a substantially continuous hinge passageway of circular cross section for slidably receiving a hinge pin 76.

Third catcher panel member 48 is configured in a manner similar to that of first and second catcher panel members 44, 46, respectively, except that only one of the longitudinal side edges, edge 78, includes longitudinally spaced hinge loops 80. Third catcher panel member 48 also includes an opposed, longitudinally extending side edge 82, parallel with side edge 78, and a pair of opposed, substantially parallel, transversely extending end edges 84, 86.

The respective longitudinal side edges of adjacent catcher panel members are each held together by respective hinge pins 76 that have a length greater than the longitudinal lengths of the respective catcher panel members. As best seen in FIG. 1, each hinge pin 76 includes a first, reduced diameter retaining groove 88 spaced inwardly from one end of pin 76, and that is adapted to receive a snap ring 90. Each hinge pin 76 also includes a second, reduced diameter retaining groove 92 adjacent the opposite end of the hinge pin to receive a snap ring 90 for retaining a compression spring 96 that causes the hinge pin 76 to be drawn in the direction toward the end at which spring 96 is positioned.

At each end of hinge pin 76 is a catcher panel retaining and orienting clip 98 that is carried on hinge pin 76 inwardly of grooves 88 and 92. Panel clip 98 is an angular connecting and positioning member that includes a pair of angularly disposed legs 100, 102, and an interconnecting gusset 103. Each of legs 100, 102 includes a channel or groove 104, 106, respectively, each channel extending along the respective clip leg and generally perpendicular with the axis of hinge pin 76. Each channel 104, 106 has an open side that faces in the same direction, generally parallel with the axis of the hinge pin. Additionally, clip 98 includes an aperture 108 to receive hinge pin 76.

As shown in FIG. 2, each of channels 104, 106 of catcher panel clip 98 fits over and engages with an end edge of a respective adjacent catcher panel member. Thus, channels 104, 106 grip and retain a pair of end edges 54, 72 of adjacent catcher panel members 44, 46, respectively, in a predetermined angular orientation relative to each other, to thereby define the overall shape and configuration of catcher assembly 42 as defined by the respective catcher panel members. Preferably, the angular orientation of legs 100 and 102 of each of catcher panel retaining and orienting clips 98 is such that the included angle therebetween is of the order of about 120°, although other included angles can also be used.

Figure 5:
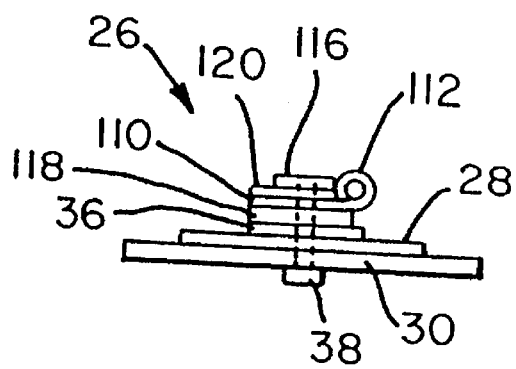
FIG. 5 is an end view of the blade assembly shown in FIGS. 3 and 4, viewed in the direction of arrow 5 shown in FIG. 4.
Figure 6:
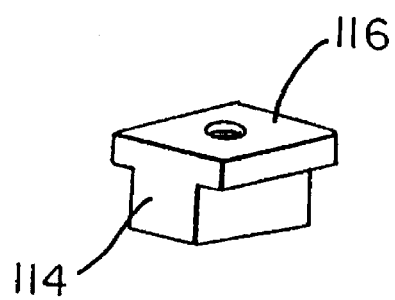
FIG. 6 is a perspective view of a tee-nut of the type used for attaching the clipping catcher to the hedge trimmer shown in FIG. 2.

When in its assembled form, as shown in FIG. 2, catcher assembly 42 is fitted to blade assembly 26 of hedge trimmer 10 by means of a plurality of bolts 38 (see FIGS. 3 and 5). Referring once again to FIG. 1, an elongated, narrow, catcher support strip 110 is provided to overlie blade assembly 26. Support strip 110 includes a series of spaced hinge loops 112 along one longitudinal edge thereof, suitably longitudinally offset from each other to interengage with the corresponding hinge loops 58 along edge 50 of first catcher panel member 44. An interiorly positioned, elongated slot 113 is provided in support strip 110 for receiving the shank portions 114 (see FIG. 6) of a plurality of tee-nuts 116. Slot 113 permits catcher assembly 42 to be attached to a number of different hedge trimmers having different spacings between connecting bolts 38.

Referring once again to FIG. 1, positioned immediately below catcher support strip 110 is a catcher lower spacer strip 118, which is also of generally rectangular, elongated form, similar to that of catcher support strip 110, and includes an elongated slot 119. Lower spacer strip 118 does not have any hinge loops. An upper spacer strip 120 that includes an elongated slot 121, and that has substantially the same configuration as lower spacer strip 118, overlies catcher support strip 110. Lower spacer strip 118 coupled with overlying catcher support strip 110 and upper spacer strip 120 provide sufficient depth to completely receive shank portions 114 of each of tee-nuts 116, to thereby facilitate retention of the tee-nuts, as best seen in FIGS. 3, 4, and 5. Preferably, catcher support strip 110 and lower and upper spacer strips 118 and 120 are preassembled as a subassembly, and are held together by a pair of rivets (not shown) that pass through the apertures formed at each longitudinal end of each of the respective strips.

The joining of catcher assembly 42 to blade assembly 26 is effected by passing a plurality of bolts 38, three being shown in FIGS. 3, 4, and 5, and connecting them with respective tee-nuts 116. Bolts 38 extend through respective apertures in stationary blade 30, respective elongated slots (not shown) in movable blade 28 to permit longitudinal movement of movable blade 28 relative to stationary blade 30, and through the respective elongated slots of each of lower spacer strip 118, catcher support strip 110, and upper spacer strip 120. Thus, lower spacer strip 118 overlies blade retainer strip 36, catcher support strip 110 overlies lower spacer strip 118, and upper spacer strip 120 overlies catcher support strip 110. As shown, shank portions 114 of the respective tee-nuts 116 are fully received within slots 119, 113, and 121 in each of lower spacer strip 118, catcher support strip 110, and upper spacer strip 120, respectively, to permit connecting bolts 38 to pass through blade assembly 26 and the respective strips 118, 110, and 120 to engage tee-nuts 116 to thereby permit a secure connection between catcher assembly 42 and blade assembly 26.

Figure 7:
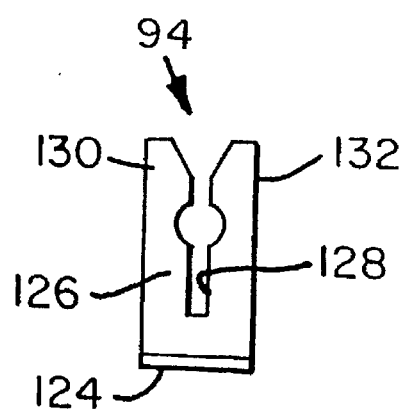
FIG. 7 is a front elevational view of a hinge pin gripper.
Figure 8:
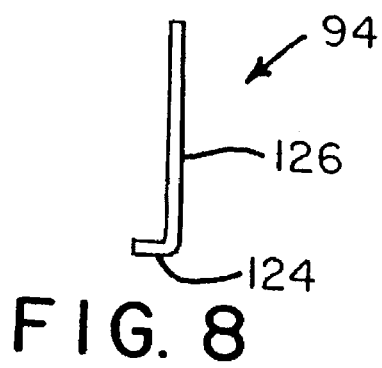
FIG. 8 is a side view of the hinge pin gripper shown in FIG. 7.

As best seen in FIG. 2, hinge pin 76 that interconnects catcher support strip 110 and first catcher panel member 44 also includes a spring retainer clip 94. Retainer clip 94 is shown in greater detail in FIGS. 7 and 8, in which clip 94 is shown to include a tab 124 and a body 126 that has an elongated, open-ended slot 128 that defines a pair of opposed legs 130, 132 to pass into groove 92 in the associated hinge pin. Clip 94 serves as a quick release for hinge pin 76 and spring 96 to permit separation of panel member 44 from support strip 110.

In the operation of the assembly of hedge trimmer 10 and clipping catcher assembly 42 as illustrated in FIG. 2, and after the catcher assembly has been securely attached to the blade assembly, the hedge trimmer can be operated for cutting in a right-to-left direction, either horizontally to trim the horizontal top surface of a hedge, vertically to trim the sides of the hedge, or at any angle in between. The clippings that are severed from the plants fall over onto and are caught by first catcher panel member 44. As additional clippings are received on first catcher panel member 44, second and third catcher panel members 46 and 48 serve to retain the accumulated clippings. When the catcher assembly 42 is full of clippings, the cutting action of the hedge trimmer can be stopped, and the hedge trimmer and catcher assembly can be carried from adjacent the hedge or plant to a suitable clipping collection bin (not shown) or bag, whereupon the outermost end of the blade assembly, the end of the blade assembly that is spaced from the transmission housing 18, can be tilted downwardly to permit the clippings to slide from the catcher into the collection bin.

After being emptied of clippings, the hedge trimmer and catcher assembly can be returned to its cutting position relative to the hedge or plant for further cutting operations. As will be apparent to those skilled in the art, the positioning of the respective panel retaining and orienting clips 98 defines the clipping receiving portion of the catcher assembly, which is in the shape of an open ended clipping collection zone having a C-shape in cross section.

When it is desired to operate the hedge trimmer for cutting in the opposite direction, or from an operator's left to his right, catcher assembly 42 in accordance with the present invention can be easily reoriented without the need to completely disconnect it from blade assembly 26. Specifically, first catcher panel member 44 is pivoted about the axis of the hinge pin that connects it with catcher support strip 110, so that the previously upwardly-facing surface of first catcher panel member 44 overlies upper spacer strip 120 and blade assembly 26. Second and third catcher panel members 46 and 48, respectively, are then each reoriented relative to the adjacent catcher panel members by first pulling outwardly on each of the respective pairs of panel clips 98, against the restraining force of springs 96, to separate the legs of clips 98 from the respective end edges of the catcher panel members. As a result, the first and second catcher panel members can freely pivot relative to each other about the interconnecting hinge pins 76.

After the respective catcher panel members have been pivoted to approximately the desired position, catcher panel retaining and orienting clips 98 are each rotated through an angle of about 180° to reorient each of the clips. When so reoriented, the leg of the clip 98 that previously had been engaged with the end edge of second catcher panel 46 is now aligned with the corresponding end edge of first catcher panel 44. Similarly, the leg of the clip 98 that previously had been engaged with the end edge of third catcher panel 48 is now aligned with the end edge of second catcher panel 46. At that point, the outwardly-directed compression force applied to the spring 96 is released, so that the spring urges the legs of each of panel retaining and orienting clips 98 into engagement with the end edges of the respective catcher panel members. The spring force will hold each of panel clips 98 in engaged position against the edges of the catcher panel members and will maintain the catcher panel members in their new positions.

When so reoriented, the respective catcher panel members define a similarly shaped catcher assembly as that shown in FIG. 2, except that it is reoriented to provide a catcher structure suitable for operation in the opposite, left-to-right direction of movement of hedge trimmer 10.

The several catcher panels of the catcher assembly herein illustrated and described are preferably made from rigid materials, such as, for example, lightweight metals or rigid plastics. An embodiment of the present invention utilizing aluminum alloy panel members and support and spacer strips, which can have a thickness of from about 0.030 inches to about 0.125 inches, has been found to be suitable, and can provide a catcher assembly having a weight of only about 1.5 pounds for a hedge trimmer having a cutting blade length of 16 inches.

Additionally, instead of three hingedly connected catcher panels, as herein illustrated and described, a clipping catcher can be constructed from a single, flexible sheet of bendable material for hinged connection with a catcher support strip corresponding with strip 110. The sheet can be bent to any desired curvature or position to provide a suitable clipping catcher.

It can be seen that the present invention as hereinabove illustrated and described provides distinct advantages over the prior art catcher devices, and that an easily reversible catcher assembly is provided for conveniently catching hedge clipper trimmings regardless of the orientation of the hedge trimmer or its direction of movement.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A clipping catcher for a powered hedge trimmer having a cutter for cutting vegetation and including a first set of relatively movable cutting blades that extend in a first direction of movement of the hedge trimmer and a second set of relatively movable cutting blades that extend in a second direction of movement of the hedge trimmer, wherein the second direction of movement is a direction opposite from the first direction of movement for enabling cutting of vegetation either in the first direction of movement of the hedge trimmer or in the second direction of movement of the hedge trimmer, said clipping catcher comprising:

a) a plurality of hingedly connected rectangular catcher panel members each having longitudinal axes disposed in substantially parallel relationship with each other, wherein the catcher panel members are hingedly connected together along hinge joints extending along opposed longitudinal edges of adjacent catcher panel members;

b) mounting means for pivotally mounting a first catcher panel member to the cutter of the powered hedge trimmer wherein the first catcher panel member is reoriented from a first position in which the first catcher panel member overlies the first set of cutting blades to a second position in which the first catcher panel member overlies the second set of cutting blades so that the clipping catcher collects clippings in either direction of movement of the hedge trimmer without disconnecting the first catcher panel member from the cutter; and c) edge connector members disposed at respective hinge joints that extend along and join adjacent panel members, wherein the edge connector member include panel clips releasably engagable with end edge portions of adjacent pairs of catcher panel members for releasably engaging the end edge portions of adjacent pairs of catcher panel members to position the adjacent pairs of catcher panel members in a predetermined angular relationship relative to each other to thereby define a clipping catcher having a generally C-shaped cross section for collecting clippings that are cut from a plant by the hedge trimmer.

2. A clipping catcher in accordance with claim 1 wherein the mounting means includes a mounting strip for connection with the cutter, the mounting strip including hinge loops for engagement with corresponding, longitudinally-offset hinge loops carried at a longitudinal edge of the first catcher panel member.

3. A clipping catcher in accordance with claim 1 wherein the clipping catcher includes three interconnected catcher panel members.

4. A clipping catcher in accordance with claim 1 wherein the edge connector members are supported from a hinge pin that interconnects longitudinal edges of adjacent catcher panel members.

5. A clipping catcher in accordance with claim 4 wherein the edge connector members include a pair of angularly disposed legs that engage end edges of respective catcher panel members.

6. A clipping catcher in accordance with claim 5 wherein the legs each include channels having openings facing the catcher panel members, wherein the legs engage end edges of adjacent catcher panel members.

7. A clipping catcher in accordance with claim 6 wherein the legs are angularly positioned relative to each other in a fixed angular relationship.

8. A clipping catcher in accordance with claim 7 wherein the fixed angular relationship is an obtuse angle.

9. A clipping catcher in accordance with claim 8 wherein the fixed angular relationship is an angle of about 120°.

10. A clipping catcher in accordance with claim 1 wherein the hinge joints include hinge pin retention means for holding a hinge pin in a predetermined position between adjacent catcher panel members.

11. A clipping catcher in accordance with claim 1 including hinge pins positioned between adjacent catcher panel members, the hinge pins having a circumferential groove adjacent an end of the hinge pin, and a retaining ring carried in the groove for retaining the edge connector members in position.

12. A clipping catcher in accordance with claim 1 including spring means carried at the hinge joints for maintaining the edge connector members in engagement with respective catcher panel members.

13. A clipping catcher in accordance with claim 1 wherein the edge connector members are in engagement with each edge of each catcher panel member.

14. A clipping catcher for a powered hedge trimmer, said clipping catcher comprising:

a) a support structure for attachment to a stationary element of a hedge trimmer cutting blade assembly, the blade assembly including a pair of relatively movable cutting blades for cutting vegetation that passes between the moving blades;

b) a first catcher panel member hingedly connected to the support structure for pivotal movement of the first catcher panel member relative to the support structure about a first hinge axis defined by a first hinge pin that extends transversely relative to cutting edges carried by the cutting blades;

c) a second catcher panel member hingedly connected to the first catcher panel member to permit relative pivotal movement of the second catcher panel member relative to the first catcher panel member about a second hinge axis defined by a second hinge pin spaced from the first hinge pin; and d) a panel retainer member carried by the second hinge pin, the panel retainer member including first and second angularly disposed engagement slots, the first engagement slot engaging an end edge of the first catcher panel member and the second engagement slot engaging an end edge of the second catcher panel member to retain the catcher panel members in a predetermined angular relationship relative to each other to retain clippings that are cut by the cutting blades.

* * * * *